UNITED STATES PATENT OFFICE.

HUGH RODMAN, OF PITTSBURGH, PENNSYLVANIA, ASSIGNOR, BY MESNE ASSIGNMENTS, TO THE ELECTRIC STORAGE BATTERY COMPANY, OF PHILADELPHIA, PENNSYLVANIA, A CORPORATION OF NEW JERSEY.

SECONDARY-BATTERY SEPARATOR.

1,051,638.   Specification of Letters Patent.   Patented Jan. 28, 1913.

No Drawing.   Application filed March 24, 1908. Serial No. 422,974.

*To all whom it may concern:*

Be it known that I, HUGH RODMAN, a citizen of the United States, and a resident of Pittsburgh, in the county of Allegheny and State of Pennsylvania, have made a new and useful Invention in Secondary-Battery Separators, of which the following is a specification.

I have discovered a material which, I believe, is perfectly satisfactory for the manufacture of storage battery separators. The material is a porous glass which is made by putting ground or powdered glass while dry and pulverulent into suitable molds and subjecting the molded mass, while still in a pulverulent condition, to a fritting temperature for a suitable length of time.

The method I am now using in carrying out my invention consists in placing powdered glass, such as is obtained commercially, in an iron or clay mold and subjecting it while in the mold and still in a pulverulent condition to a temperature of about 1200 or 1250° F. for a period ranging from thirty minutes to an hour. The separate particles of glass, of the molded and pulverulent mass, when subjected to this temperature for a sufficient length of time, frit together and produce a strong and very porous glass ware which is admirably suited for purposes ordinarily served by weaker and less porous earthenware. During the fritting operation the separate particles of glass settle somewhat, depending upon the time and temperature of heating.

I have also successfully molded finely ground glass while it is wet, by using with it a setting material, such, for instance, as magnesium sulfate, which, in drying, sets the mass of molded glass so that it may be subsequently heated to frit the separate particles of glass together. The magnesium sulfate may subsequently be eliminated by dissolving in water. I do not believe, however, that this process produces nearly as good results as the fritting of the dry pulverulent mass.

Either process produces a porous glass which is far superior, as regards strength, inertness, porosity and ability to resist the effects of changes of temperature, to any material with which I am familiar.

I believe there is a peculiar merit attached to the method of burning or firing the molded mass while in a dry, pulverulent condition. Just what the explanation of this advantage is I am unable to definitely state, but I believe it is due to the settling which occurs to some extent during the fritting operation and which allows a re-arrangement of the particles that is impossible with substances molded or set before firing.

In accordance with the provisions of the patent statutes, I have described a preferred method of carrying out my invention and producing the new and improved article which forms the invention, but I desire to have it understood that other methods may be employed and still fall within its spirit and scope.

What I claim is:

1. A porous separator formed of finely-divided glass, molded without a binder, and fritted.

2. An electric battery separator consisting of an integral mass of porous glass.

In testimony whereof, I have hereunto subscribed my name this 21st day of March, 1908.

HUGH RODMAN.

Witnesses:
CHARLES W. MCGHEE,
E. W. MCCALLISTER.